US012254595B2

(12) United States Patent
Price et al.

(10) Patent No.: US 12,254,595 B2
(45) Date of Patent: Mar. 18, 2025

(54) ADVANCED TEMPORAL LOW LIGHT FILTERING WITH GLOBAL CAMERA MOTION COMPENSATION AND LOCAL OBJECT MOTION COMPENSATION

(71) Applicant: Microsoft Technology Licensing, LLC, Redmond, WA (US)

(72) Inventors: Raymond Kirk Price, Carnation, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 452 days.

(21) Appl. No.: 17/682,315

(22) Filed: Feb. 28, 2022

(65) Prior Publication Data
US 2023/0274401 A1    Aug. 31, 2023

(51) Int. Cl.
*G06T 5/50*       (2006.01)
*G06T 7/223*      (2017.01)
(Continued)

(52) U.S. Cl.
CPC .............. *G06T 5/50* (2013.01); *G06T 7/223* (2017.01); *G06V 10/30* (2022.01); *G06V 10/62* (2022.01); *G06T 2207/20216* (2013.01)

(58) Field of Classification Search
CPC ........... G06T 5/50; G06T 7/223; G06V 10/30; G06V 10/62
See application file for complete search history.

(56) References Cited

U.S. PATENT DOCUMENTS 7,639,741 B1 * 12/2009 Holt .................. H04N 19/80
                                              375/240.27
9,262,839 B2 *  2/2016 Mori .................. G06T 7/579
(Continued)

FOREIGN PATENT DOCUMENTS

WO    WO-2016128138 A1 *  8/2016 ........... G06T 3/4007

OTHER PUBLICATIONS

Niu, Y., Dick, A., & Brooks, M.J. (2008). A new combination of local and global constraints for optical flow computation. 2008 23rd International Conference Image and Vision Computing New Zealand, 1-6. (Year: 2008).*
(Continued)

*Primary Examiner* — Utpal D Shah
*Assistant Examiner* — Jack Peter Kraynak
(74) *Attorney, Agent, or Firm* — Workman Nydegger

(57) ABSTRACT

Techniques for generating a temporally filtered image designed to compensate for global motions of a camera and to compensate for local motions of an object are disclosed. A history frame and a current frame are acquired. A global motion compensation operation is performed on the history frame to reproject a pose of the history frame to match the pose of the current frame. The history frame is compared against the current frame to identify pixels that represent moving objects. For each of those pixels, an optical flow vector is computed. The optical flow vectors are then applied to those pixels to shift those pixels to new locations. These new positions, which are in the history frame, correspond to positions that were identified in the current frame. Afterwards, the current frame is temporally filtered with the history frame.

8 Claims, 12 Drawing Sheets

(51) Int. Cl.
  *G06V 10/30* (2022.01)
  *G06V 10/62* (2022.01)

(56) References Cited

U.S. PATENT DOCUMENTS

| | | | |
|---|---|---|---|
| 10,134,110 B1* | 11/2018 | Liu | H04N 19/587 |
| 11,778,224 B1* | 10/2023 | Vanam | H04N 19/14 |
| | | | 375/240.12 |
| 2004/0001705 A1* | 1/2004 | Soupliotis | G06T 5/73 |
| | | | 348/208.99 |
| 2007/0248166 A1* | 10/2007 | Chen | H04N 19/44 |
| | | | 375/E7.193 |
| 2011/0085084 A1* | 4/2011 | Jain | G06T 5/70 |
| | | | 375/E7.076 |
| 2011/0211119 A1* | 9/2011 | Petrides | H04N 7/0127 |
| | | | 348/576 |
| 2014/0147012 A1* | 5/2014 | Park | G06T 7/223 |
| | | | 382/107 |
| 2014/0369557 A1* | 12/2014 | Kayombya | G06T 7/73 |
| | | | 382/103 |
| 2019/0045223 A1* | 2/2019 | Levy | H04N 19/137 |
| 2020/0267339 A1* | 8/2020 | Douady-Pleven | H04N 19/136 |
| 2023/0217109 A1* | 7/2023 | Bryson | H04N 23/6811 |
| | | | 348/208.6 |

OTHER PUBLICATIONS

Purica, Andrei & Mora, Elie & Pesquet, Beatrice & Ionescu, Bogdan. (2015). Improved view synthesis by motion warping and temporal hole filling. 10.1109/ICASSP.2015.7178158. (Year: 2015).*
"International Search Report and Written Opinion issued in PCT Application No. PCT/US22/050995", Mailed Date: Apr. 11, 2023, 18 Pages.
Purica, et al., "Improved View Synthesis by Motion Warping and Temporal Hole Filling", In Proceedings of IEEE International Conference on Acoustics, Speech and Signal Processing, Apr. 19, 2015, pp. 1191-1195.

* cited by examiner

ADVANCED TEMPORAL LOW LIGHT FILTERING WITH GLOBAL CAMERA MOTION COMPENSATION AND LOCAL OBJECT MOTION COMPENSATION

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system may also employ different types of cameras in order to display content to users, such as in the form of a passthrough image. A passthrough image or view can aid users in avoiding disorientation and/or safety hazards when transitioning into and/or navigating within an MR environment. An MR system can present views captured by cameras in a variety of ways. The process of using images captured by world-facing cameras to provide views of a real-world environment creates many challenges, however.

To improve the quality of the images that are displayed to a user, some MR systems perform what is called "temporal filtering." Temporal filtering refers to the process by which the system combines data that is captured over multiple timepoints to generate a particular output. In other words, the system essentially stacks multiple images on top of one another and combines them in a manner so as to produce an aggregated image having an improved quality.

For instance, in the MR system scenario, the system combines image data of consecutively captured images to generate an improved output. As an example, consider a low light scenario. Because of the low light, each individual image might be capable of providing only a limited amount of image data. By combining the data from multiple consecutively captured images, however, the system (e.g., by combining the data from all of those images via temporal filtering) can produce a suitable output image. In this sense, the process of temporal filtering involves capturing multiple image frames over a period of time and then combining the image data from those frames to produce an output frame, resulting in a scenario where the output frame is actually an aggregation of multiple input frames.

Various challenges occur when performing temporal filtering, however. For example, so-called "ghosting effects" can result if an object in the scene or environment is moving while the system captures the multiple consecutive images. More particularly, ghosting occurs when an object or image artifact has a trail of pixels that follow the object (e.g., a form of motion blur). This trail of pixels occurs because the object is at different locations while the multiple consecutive images are being generated, and those different locations are then reflected in the final composite image.

Another challenge occurs when the camera itself undergoes movement while it is generating the images. Movements of the camera can also skew the temporal filtering process. It may be the case that the camera is moving in non-MR system scenarios, such as perhaps in vehicles. In this regard, there are other technical areas where these challenges occur. Yet another challenge relates to the quality or resolution of the final output image. In view of these challenges, as well as others, there is a substantial need to improve the temporal filtering process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for generating a temporally filtered image designed to compensate for global motions of a camera and to compensate for local motions of one or more objects that are locally moving within a scene.

Some embodiments acquire a history frame and a current frame of a scene, where the current frame is generated by a camera. In response to determining a first pose of the camera when the current frame was generated (e.g., perhaps using inertial measurement unit (IMU) data), the embodiments perform a global motion compensation operation on the history frame to reproject a second pose of the history frame to match the first pose. After performing the global motion compensation operation, the motion compensated history frame is compared against the current frame to identify a set of pixels that are located at a first set of positions within the motion compensated history frame but that are located at a second set of positions within the current frame. This set of pixels corresponds to one or more objects that moved locally within the scene. Also, the second set of positions is different than the first set of positions. For each pixel in the set of pixels, the embodiments compute a corresponding optical flow vector. As a consequence, multiple optical flow vectors are computed. These optical flow vectors map movement of the objects, where the movement is represented by the set of pixels being at the first set of positions in the motion compensated history frame and being at the second set of positions in the current frame. The embodiments generate an adjusted history frame from the motion compensated history frame by applying the optical flow vectors to the set of pixels included in the motion compensated history frame to shift the set of pixels from being at the first set of positions in the motion compensated history frame to being at new positions. These new positions in the adjusted history frame correspond to the second set of positions that were identified in the current frame for the set of pixels. After shifting the set of pixels to the new positions in the adjusted history frame, the embodiments temporally filter the current frame with the adjusted history frame to generate a temporally filtered image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
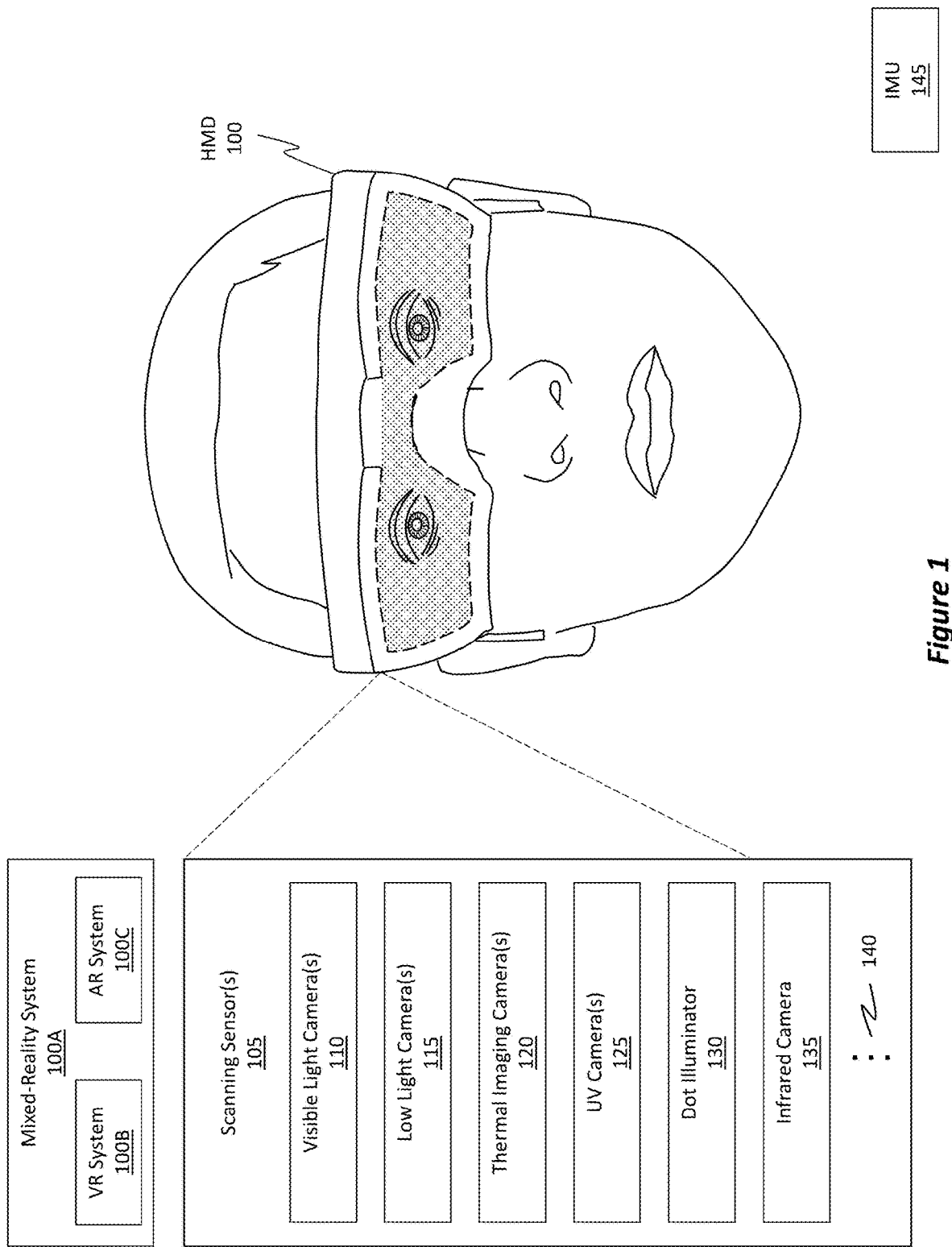
FIG. 1 illustrates an example of an HMD.

Embodiments disclosed herein relate to systems, devices, and methods for generating a temporally filtered image designed to compensate for global motions of a camera and to compensate for local motions of one or more objects that are locally moving within a scene.

Some embodiments acquire a history frame and a current frame of a scene. In response to determining a first pose of the camera when the current frame was generated, the embodiments perform a global motion compensation operation on the history frame to reproject a second pose of the history frame to match the first pose. Afterwards, the motion compensated history frame is compared against the current frame to identify a set of pixels (corresponding to specific content in the scene) that are located at a first set of positions within the motion compensated history frame but that are located at a second set of positions within the current frame. In other words, the content moved in the scene, and the pixels representing that content are now at new locations in the current frame. For each pixel in the set, the embodiments compute a corresponding optical flow vector. These optical flow vectors map movement of the objects. The embodiments apply the optical flow vectors to the set of pixels to shift those pixels from being at the first set of positions to being at new positions in an adjusted history frame. These new positions in the adjusted history frame correspond to the second set of positions that were identified in the current frame. Afterwards, the embodiments temporally filter the current frame with the adjusted history frame to generate a temporally filtered image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field. That is, the embodiments provide improvements to the technical field of temporal filtering and generating images. For instance, the disclosed embodiments provide for the ability for a system to operate in sub-optimal conditions, such as low light conditions, yet still be able to produce high resolution output images. To illustrate, the disclosed principles can be practiced in low luminance environments where the camera sensors might possibly detect less than 1 photon per image frame (aka image). Despite these sub-par conditions, the embodiments beneficially achieve improved output signals by temporally combining multiple frames together.

The embodiments also beneficially reduce or entirely eliminate ghosting effects, which might otherwise occur in traditional systems when objects in the scene are moving. The principles can also be implemented even where there are high levels of noise in the generated images, or when there is a low signal to noise ratio for the imagery. That is, the principles can be practiced in a broad range of conditions.

If the camera is moving, then a motion compensation operation can be performed to compensate for that motion. As used herein, the phrase "motion compensation" (MC) refers to a process by which the pose in one image is modified/reprojected based on motion data (e.g., IMU data). The modification is designed to have the original pose match a subsequent or predicted pose, which is optionally predicted or is determined based on the IMU data. Optionally, some embodiments can use feature matching to determine the poses.

The embodiments can also account for objects that are locally moving with the scene/environment. Traditionally, such movements would create ghosting effects in the resulting temporally filtered image. The disclosed embodiments, on the other hand, can compensate and account for the movement, resulting in a higher quality image.

Beneficially, the disclosed principles can be practiced in other, non-MR system scenarios, such as perhaps in the context of a smart vehicle. Accordingly, these and numerous other benefits will now be described throughout the remaining portions of this disclosure.

Example MR Systems And HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed. A passthrough image can be generated as a result of performing temporal filtering on multiple consecutively generated images.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially ultraviolet (UV) camera(s) 125, potentially a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 110 micro-lux and about 10 lux.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns.

These wavelengths are also included in the light spectrum(s). Because the thermal imaging camera(s) 120 detect far-IR radiation, the thermal imaging camera(s) 120 can operate in any illuminance condition, without restriction.

The HMD 100 can also be equipped with an inertial measurement unit (IMU), as shown by IMU 145. The IMU 145 measures forces, angular rates, and orientation using a combination of accelerometers, gyroscopes, and magnetometers. The IMU 145 produces IMU data, which can be used by the disclose embodiments.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 μm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 μm to 1100 μm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 μm to 2 μm wavelength range.

The disclosed embodiments may be structured to utilize numerous different camera modalities. The different camera modalities include, but are not limited to, visible light or monochrome cameras, low light cameras, thermal imaging cameras, and UV cameras.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

In some scenarios, noise may be present in one of the images. For instance, in very low light conditions (e.g., 1.0 millilux or "starlight" environments), there might not be enough light photons in the environment for the low light camera to generate a high quality image. Indeed, the resulting image generated by the low light camera may be heavily corrupted with noise. When such conditions occur, the embodiments are beneficially able to perform temporal filtering. More details on temporal filtering will be provided shortly.

By way of reference, however, it is beneficial to note the general illuminance metrics for different scenarios. For instance, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a so-called "low light environment" at least corresponds to any environment in which the ambient light intensity is at or below about 40 lux. The HMD has one or more sensors that are configured to determine the surrounding environment lux intensity. These sensors can be incorporated into or independent from the cameras and/or illuminators described herein.

When used in a very low light environment (e.g., about 1.0 millilux or "starlight" environments), the low light camera sensors attempt to compensate for the low light condition by ramping up the camera's gain (e.g., digital gain, analog gain, or a combination of digital and analog gain). As a result of ramping up the camera sensor's gain, the resulting image can be very noisy. In an effort to improve the quality of the images, the embodiments perform temporal filtering.

Temporal Filtering

Figure 2:
FIG. 2 illustrates how the HMD can generate an image and how, in some cases, that image might be noisy.
Figure 3:
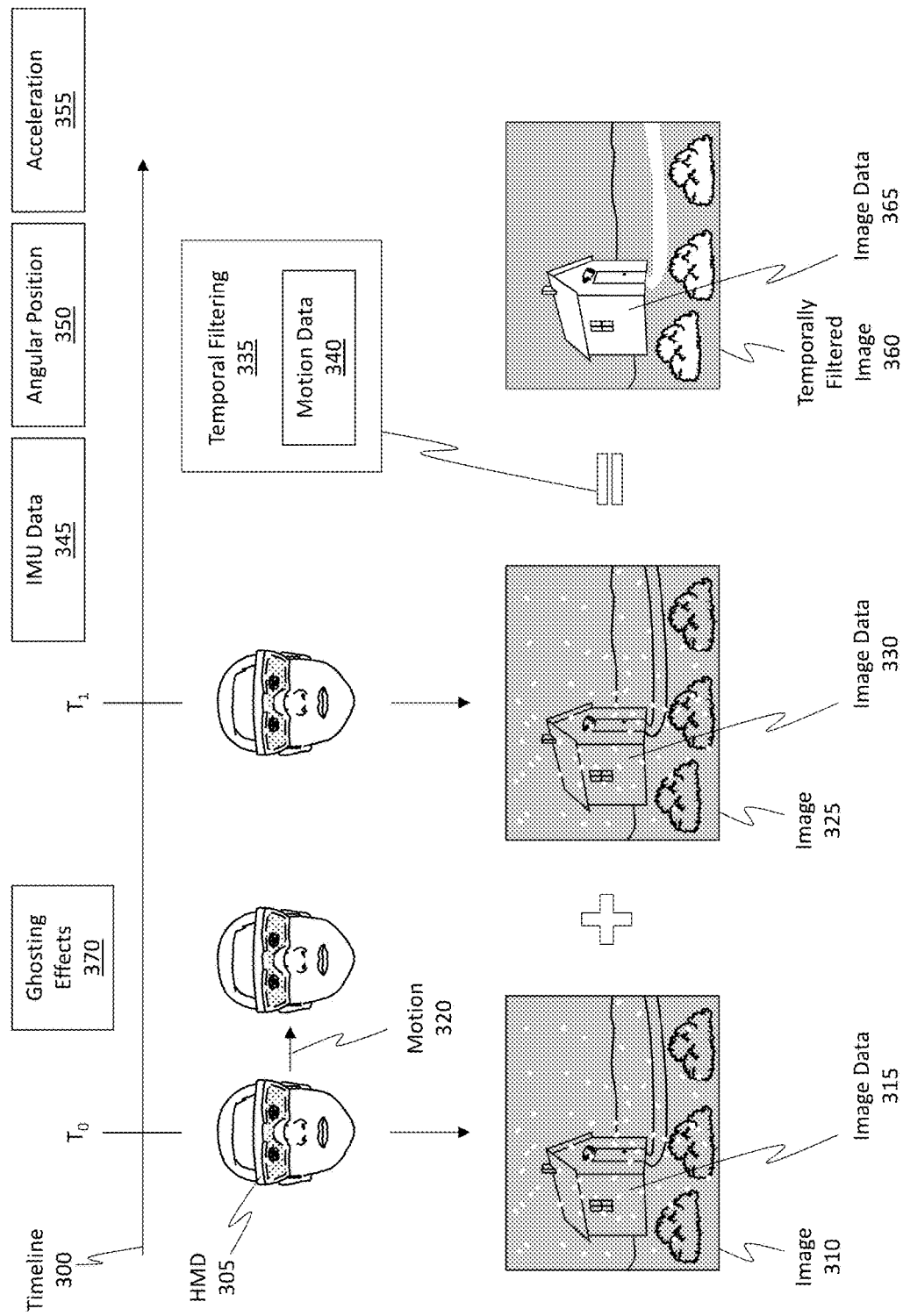
FIG. 3 illustrates an example timeline illustrating how temporal filtering is performed.

FIG. 2 shows an HMD 200, which is representative of the HMD 100 of FIG. 1. HMD 200 has generated an image 205 in a low light environment 210. As shown, the image 205 includes various different image data 215. Because the image 205 was generated in a low light scenario, however, there is a significant amount of noise 220 (e.g., the white dots throughout the image 205). If used by itself, the image 205 would provide a generally poor quality image for presentation to a user. With that understanding, then, the embodiments are configured to perform temporal filtering. FIG. 3 provides some useful details.

FIG. 3 shows a timeline 300. At time $T_0$, an HMD 305 (which is representative of the HMDs discussed thus far) generates an image 310 that includes image data 315. Similar to the scenario presented in FIG. 2, the image 310 was generated in a low light environment. FIG. 3 also notes how, subsequent to time $T_0$, the HMD (or rather, the camera) undergoes some amount of motion 320 or movement. This movement of the camera can be referred to as a global movement.

At time $T_1$, the HMD 305 then generates a second image 325, which includes image data 330. In accordance with the disclosed principles, the embodiments are able to use image 310 and image 325 to perform a temporal filtering 335 operation. The embodiments can also use motion data 340 generated by an IMU to compensate for the motion 320 (i.e. the global motion) that occurred between time $T_0$ and $T_1$. That is, the embodiments can acquire IMU data 345, which details the angular position 350 and the acceleration 355 of the camera that generated the images 310 and 325. The angular position 350 details the orientation of the camera using a three degrees of freedom (DOF) basis, while the acceleration 355 details whether the camera is translating or moving.

A motion compensation operation (i.e. a reprojection operation) generally involves modifying one pose to match a different pose. The different pose might be a predicted pose based on the motion data 340 or it might be a pose matching a newly acquired (i.e. "current") frame. As an example, image 310 reflected or embodied a first pose of the HMD 305 at time $T_0$. The HMD 305 then shifted to a new position or pose, as shown by motion 320. The IMU captured the movement of the HMD 305 between time $T_0$ and $T_1$. The HMD 305 can use the IMU data to predict a new pose of the HMD 305 at time $T_1$ (or perhaps even a later time). Based on this prediction, the HMD 305 can then perform a motion compensation operation to transform the pose embodied in image 310 to reflect the predicted pose of the HMD 305 (as it will be at time $T_1$). At time $T_1$, the HMD 305 generates the image 325. As indicated above, the new pose can also be one acquired from a current frame such that the new pose is not a predicted pose.

The embodiments are able to compare the motion compensated pose (which was designed in an attempt to reflect the HMD 305's pose at time $T_1$) with the actual pose of the HMD 305 at time $T_1$. The level or amount of difference between those two poses reflects the accuracy of the motion compensation. If there is no difference, then the motion compensation operation was 100% successful. On the other hand, the larger the amount of difference, the worse the motion compensation performed. Measuring or comparing the differences is primarily performed by comparing each pixel's intensity level with one another. That is, a first pixel in the motion compensated image is identified, and a corresponding pixel in the image 325 is identified. The intensity levels for these two pixels are compared against one another. The resulting difference between those two values reflects the accuracy of the motion compensation operation.

Performing motion compensation is desirable because of the temporal filtering process. Recall, the temporal filtering process essentially stacks multiple images on top of one another and combines the data from those images to generate an enhanced image. For the stacking to work properly, the poses in each of those different images should align with one another. Thus, the motion compensation operation is performed in order to align the various different poses for the various different images.

As a result of performing the temporal filtering 335 operation, the embodiments are able to generate a temporally filtered image 360 that has improved or enhanced image data 365 as compared to the image data 315 and 330 of the previous images. Additionally, as will be described momentarily, not only do the embodiments beneficially compensate for motions of the camera, but the embodiments also beneficially reduce the impact of ghosting effects 370 for objects that are moving in the scene. Notably, in some embodiments, an exposure setting of the camera remains unchanged while the camera generates the images.

When objects in the scene move, those objects can create the ghosting effects mentioned earlier when the images are stacked on top of one another during the generation of the temporally filtered image. The disclosed embodiments are configured to account and compensate for local movements of objects that are locally moving within the scene. Accordingly, as used herein, a "global" movement refers to a movement of the camera and results in a change in pose of the resulting image while a "local" movement refers to a movement of an object that is present in the scene. IMU data can be used to compensate for the global movements (i.e. by performance of a global MC operation), but IMU data cannot be used to compensate for local movements. Instead, a different operation (e.g., a local MC operation) is performed to account for local movements of objects.

Global And Local Motion Compensation Processes

Attention will now be directed to FIGS. 4A, 4B, 4C, 4D, 4E, 5A, and 5B. These figures illustrate various scenarios in which the disclosed embodiments perform global and local motion compensation operations.

Figure 4A:
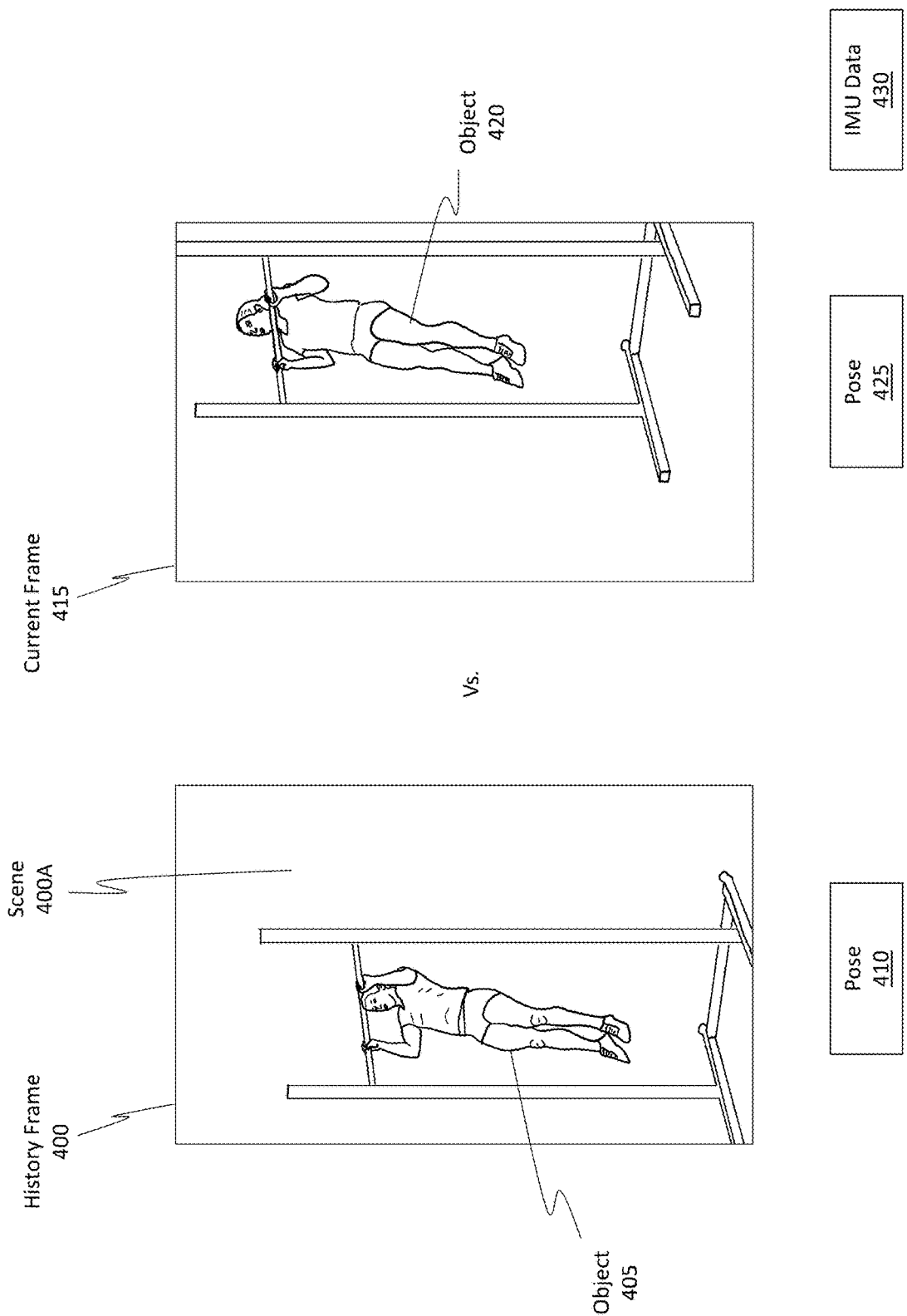
FIGS. 4A, 4B, 4C, 4D, and 4E illustrate various operations for performing global and local motion compensation operations.

FIG. 4A shows an example of a history frame 400. The history frame 400 can be a previously generated image or, alternatively, the history frame 400 can be an existing temporally filtered image frame that was generated by stacking multiple previous images together in the manner described previously. The history frame 400 depicts a scene 400A or an environment (e.g., a scene where a woman is performing a pullup on a pullup bar).

The history frame 400 depicts an object 405 (e.g., the person performing the pullup). Notice also, the history frame 400 has a particular pose 410 associated with it. Specifically, the pullup bar is currently positioned in the lower left hand corner of the image. The pose 410 refers to the positioning of the camera that generated the image frame or, alternatively, refers to a perspective that is embodied within an image (such as in the case where the image was not generated by a camera but rather is an image generated by a temporal filtering process). Based on the perspective embodied within the history frame 400, the camera was positioned slightly away from the pullup bar with its optical axis aimed at the right-most vertical bar of the pullup bar.

The camera can be any of the cameras mentioned earlier with respect to FIG. 1. In some cases, the camera is one of a single-photon avalanche diode (SPAD) camera, a single photon detector, a super cooled camera, a scientific camera module, or an image intensifier II plus a complementary metal-oxide semiconductor (CMOS) camera. In some implementations, the camera is a low noise camera.

The history frame 400 was generated at a particular point in time, such as time $T_0$. At a later point in time (e.g., $T_1$), a current frame 415 is generated by the camera. During the intervening time between time $T_0$ and $T_1$, both global and local movements have occurred.

To illustrate, notice the current frame 415 also includes a depiction of the object 420, and the current frame also has a corresponding pose 425. Notably, the pose 425 is different than the pose 410. This difference occurred because the camera shifted position between time $T_0$ and time $T_1$. In other words, a global movement transpired (i.e. the camera itself shifted positions).

The disclosed camera systems are able to operate anywhere between 30 frames per second (FPS) and 120 FPS. Often, the camera operates at a rate of about 90 FPS (e.g., the current frame can be generated at a rate of about 90 FPS). Due to this fast rate, it is typically the case that the amount of movement between the history frame 400 and the current frame 415 is often quite small. That is, it is typically the case that the amount of global movement and/or local movement is often quite small, such as perhaps a certain number of pixels in movement (e.g., anywhere from 1 pixel of movement to amounts that sometimes exceed perhaps 100 pixels of movement). The amount of movement demonstrated by the poses 410 and 425 is exaggerated in an effort to provide a more illustrative example.

For instance, the pose 425 now shows how the pullup bar is positioned to the right-hand side of the current frame 415. In other words, the camera shifted to the left when it moved. Also, it appears as though the optical axis of the camera is now aimed at the left-most vertical bar of the pullup bar.

In accordance with the principles discussed previously, the embodiments are able to use an IMU to generate IMU data 430. This IMU data 430 can be used to perform a global motion compensation operation to account for the global movements of the camera.

In FIG. 4A, however, one can also observe how the object 405 locally moved within the scene. Whereas the woman in the history frame 400 is shown as being near the bottom of her pullup, the woman in the current frame 415 is shown as being near to the top of her pullup, as shown by object 420. Again, the amount of movement of the object (i.e. local movement) is exaggerated to provide a better illustration.

Figure 4B:
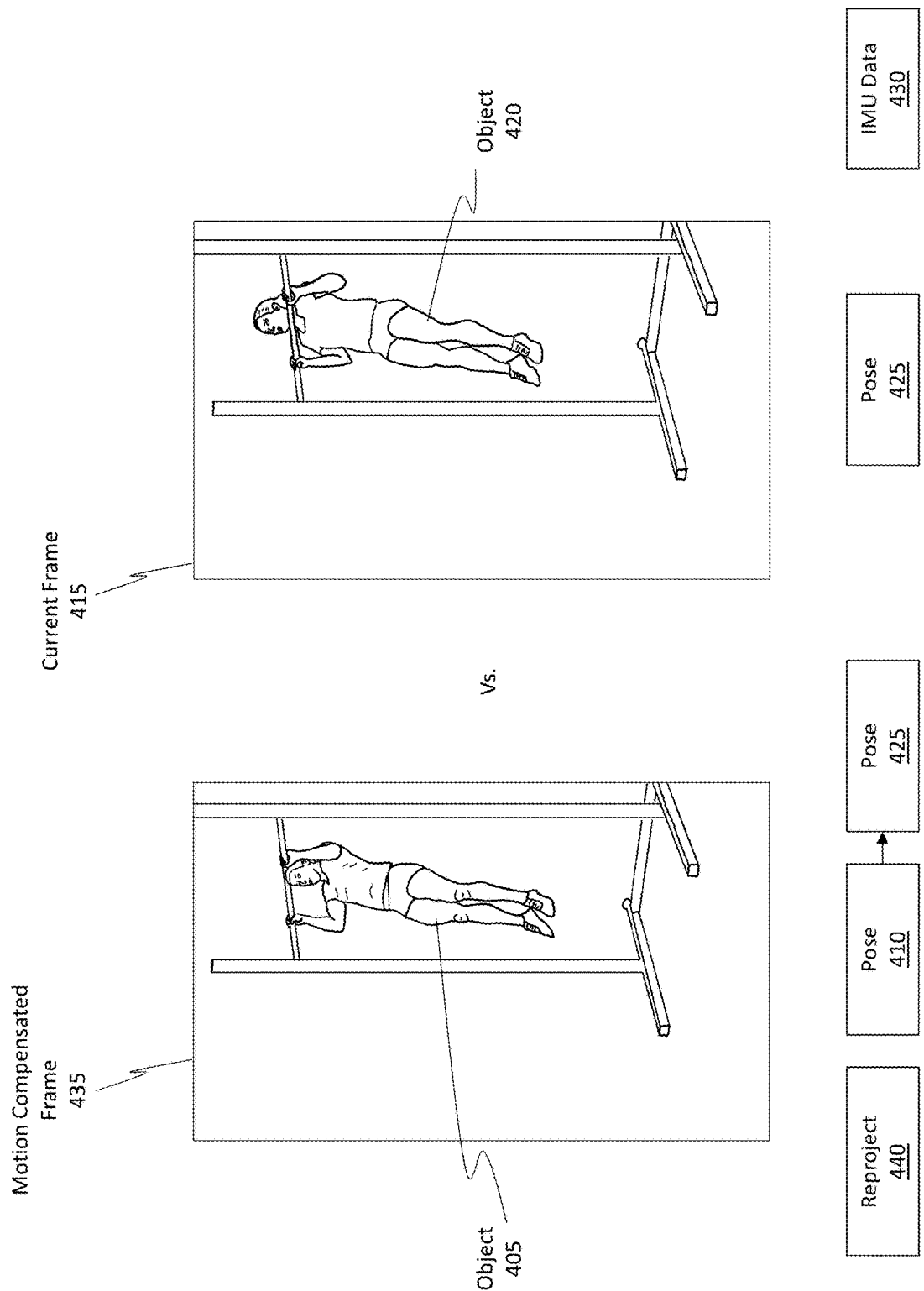

Although the global motion compensation operation can beneficially account and compensate for the changes in pose of the camera (e.g., the difference between the pose 410 and the pose 425), the IMU data 430 cannot be used to account for the local changes of moving objects. What is needed, therefore, is a technique to compensate for changes that occur as a result of objects moving within the scene between the time when the history frame 400 was generated and the time when the current frame 415 was generated. FIG. 4B more fully clarifies the global motion compensation operation and FIGS. 4C and 4D clarify aspects related to compensations for moving objects (i.e. local movements).

As discussed, the embodiments are configured to use the IMU data 430 to perform a global motion compensation (MC) on the history frame 400. As a result of performing the global MC operation, the motion compensated frame 435 is generated, as shown in FIG. 4B. In particular, the embodiments use the IMU data 430 to reproject 440 the pixels in the history frame 400 so that the pose 410 reflects a new pose, in this case the new pose is the pose 425 of the current frame 415. Stated differently, the embodiments reproject the history frame to have a new pose that matches the current frame.

Notice, in FIG. 4B, the pose of the motion compensated frame 435 shows the pullup bar now at a position that matches the position of the pullup bar in the current frame 415. In other words, it appears as though the motion compensated frame 435 was generated by a camera that is at the same position as the camera that generated the current frame 415.

Although the poses are now aligned with one another, one can observe how the object 405 is still at a different position than the object 420. This difference occurred because the object moved between time $T_0$ and time $T_1$. As such, an additional operation should be performed in order to fully align the images.

Figure 4C:
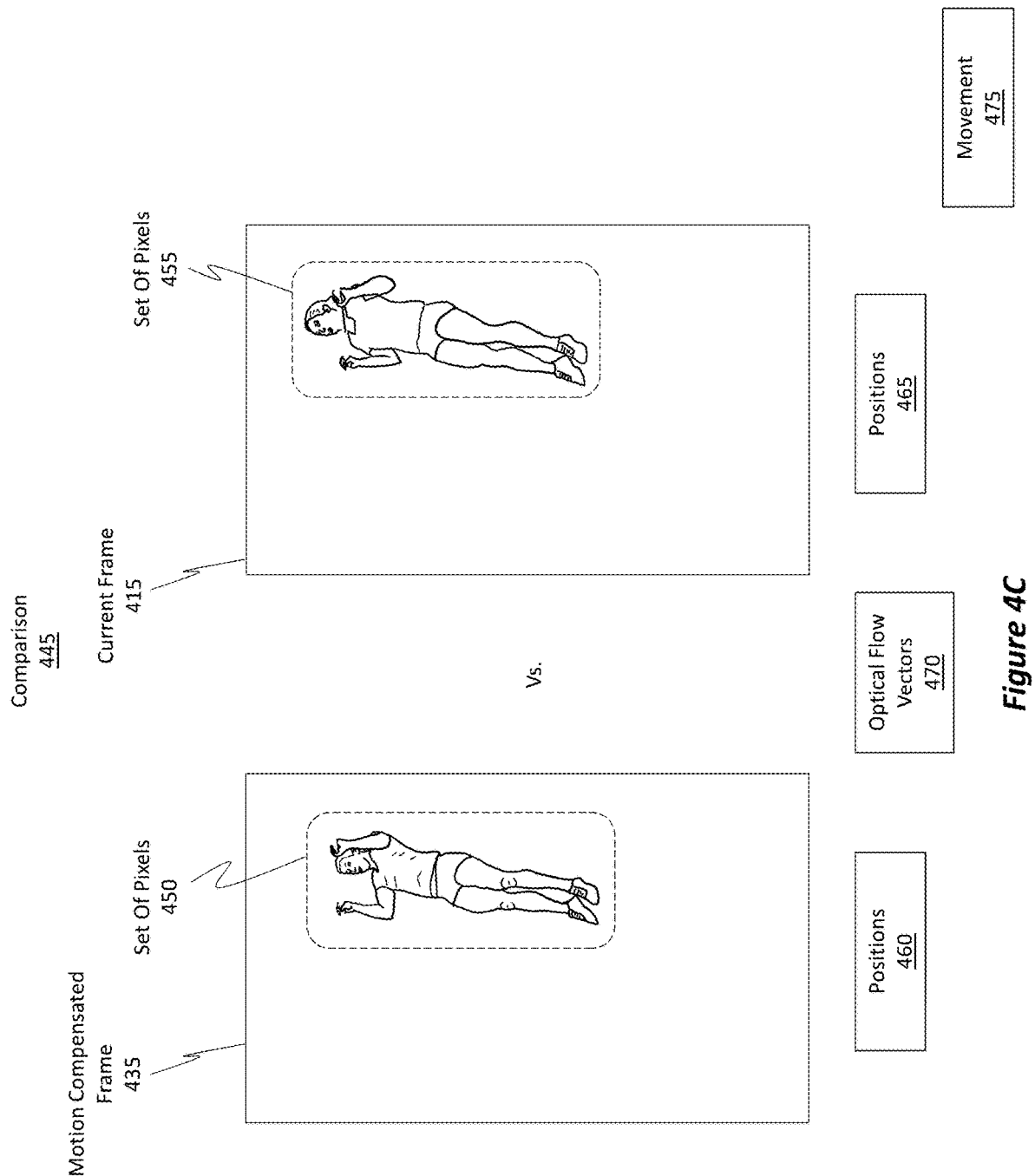

As illustrated in FIG. 4C, the embodiments are configured to perform a comparison 445 process that segments out pixels that are identified as corresponding to moving objects. For instance, the embodiments can compute the absolute difference between the current frame 415 and the motion compensated frame 435 from FIG. 4B. Pixels that are different between those two images correspond to content that is moving in the scene. In some cases, the process of comparing the frames to identify pixels can be performed using a block-matching algorithm.

FIG. 4C shows the result of the segmentation or comparison process. Specifically, in response to computing the absolute difference between the two images or perhaps in response to executing a block-matching algorithm, the embodiments identify a first set of pixels 450 in the motion compensated frame 435 and identify a second set of pixels 455 in the current frame 415. The remaining pixels can optionally be filtered out.

The embodiments identify positions 460 or coordinates for the set of pixels 450 and positions 465 or coordinates for the set of pixels 455. The embodiments also compute an optical flow vector for each pixel included in the set, as shown by the optical flow vectors 470. The combination of these vectors represents the degree or amount of movement 475 that the object(s) moved. By way of additional clarification, the embodiments are able to identify a first pixel in the set of pixels 450. The embodiments identify a corresponding pixel in the set of pixels 455. The embodiments then determine an optical flow vector for this specific pixel based on that pixel's position in the current frame 415 and the motion compensated frame 435.

As a specific example, consider a pixel representing the woman's left eye. The embodiments are able to identify this specific pixel in the set of pixels 450. The embodiments also identify that pixel's current position or coordinates within the motion compensated frame 435. The embodiments then search for the pixel that represents the woman's left eye in the current frame 415. Once that pixel is identified in the current frame 415, the embodiments determine that pixel's position or coordinates within the current frame 415. Having just identified the pixel's two positions, the embodiments then determine an optical flow vector for that pixel, where the optical flow vector is a 2D vector reflecting the amount of movement the pixel (which corresponds to the woman's left eye) experienced. That is, each optical flow vector is a two-dimensional (2D) vector. The embodiments identify a corresponding optical flow vector for each pixel that was segmented out. For example, the embodiments identify optical flow vectors for some, and perhaps all, of the set of pixels 450, where the optical flow vectors identify movements of pixels based on their positions in the set of pixels 450 and their positions in the set of pixels 455.

Sometimes, the optical flow vectors might be different for different pixels. For instance, a first optical flow vector can be different than a second optical flow vector. Such a scenario can possibly arise when the object is moving at an angle relative to the camera, such as moving in a rightward direction while also moving towards or away from the camera. In some cases, the optical flow vectors might possibly all be substantially the same, such as in a scenario where a far-away object is moving left or right without moving farther from or nearer to the camera. Because the object is far away, slight movements toward or away from the camera are likely unobservable, but movements up, down, left, or right can be tracked.

Figure 4D:
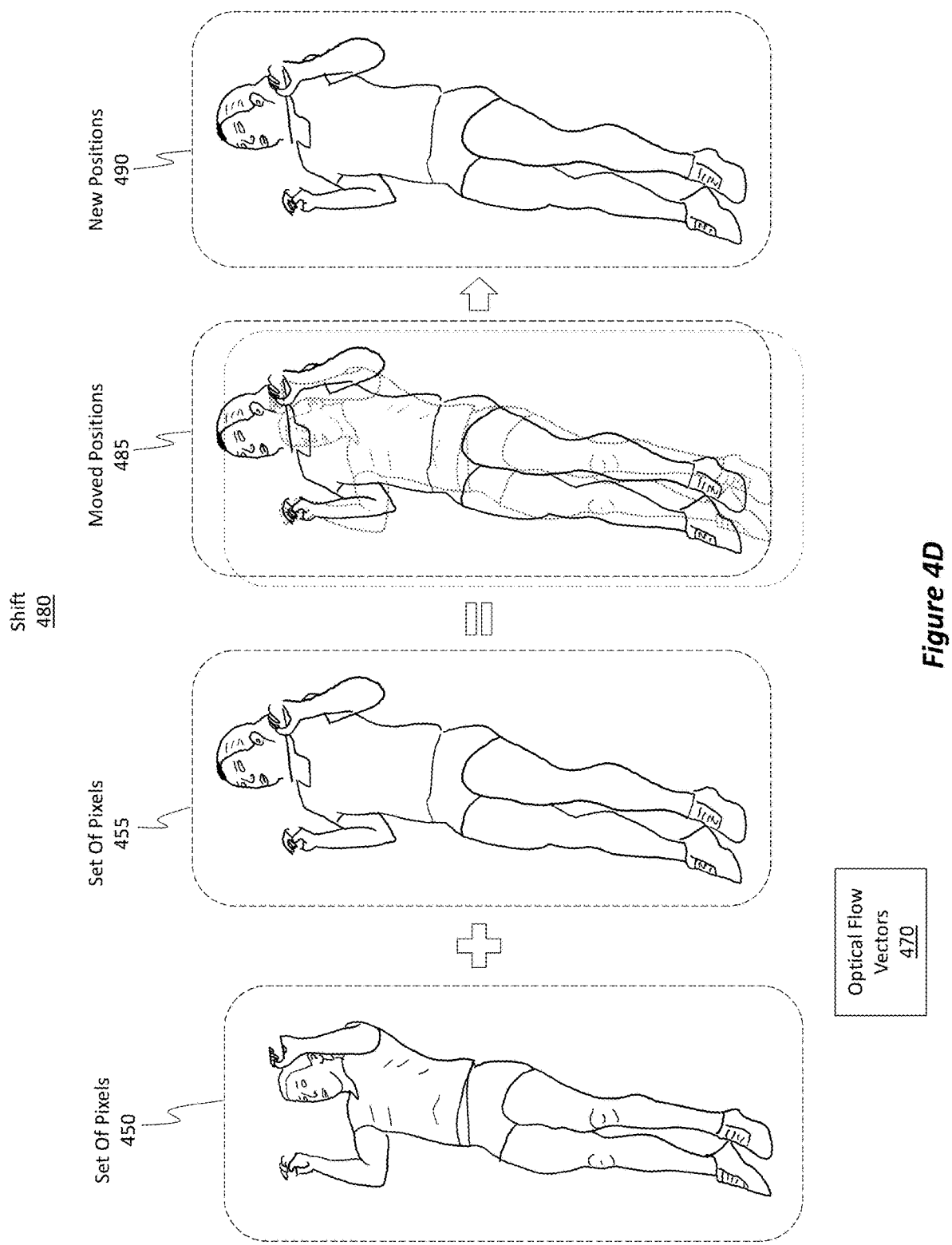

With the optical flow vectors computed, the embodiments can then perform a shift 480 operation, as reflected in FIG. 4D. Specifically, the embodiments shift the set of pixels 450, which are included in the motion compensated frame 435, to positions corresponding to the positions identified in the set of pixels 455, which are included in the current frame 415. This shift is based on the optical flow vectors 470.

FIG. 4D shows this shift by a set of superimposed images, as reflected by the moved positions 485, where the set of pixels 450 are being moved to positions that are shown by the set of pixels 455. The result of the shift is shown by the new positions 490. The new positions 490 refer to new positions of the set of pixels 450 that are now included in a so-called "adjusted history frame."

Figure 4E:
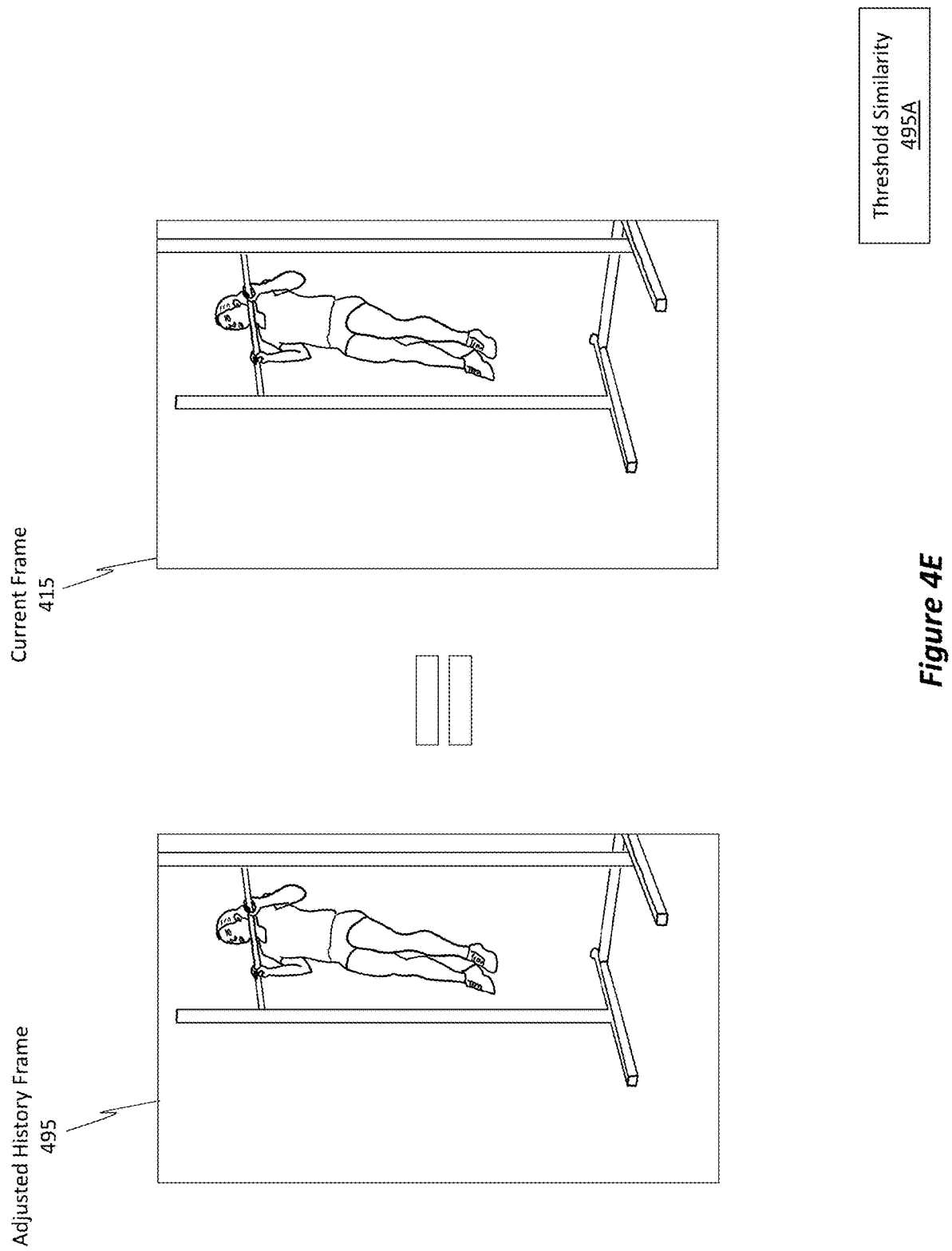
Figure 5A:
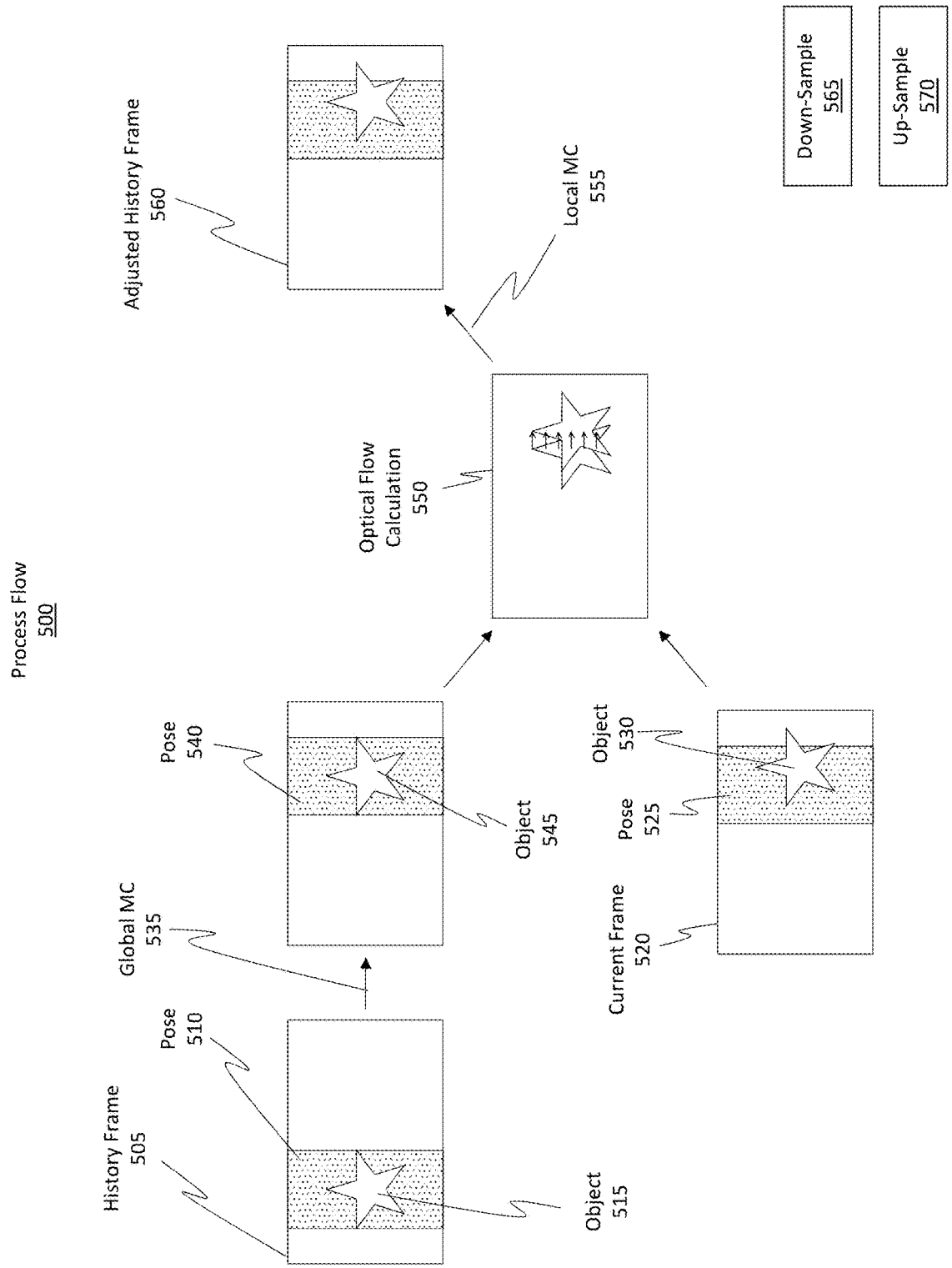
FIGS. 5A and 5B illustrate a high level overview of the disclosed operations.
Figure 5B:
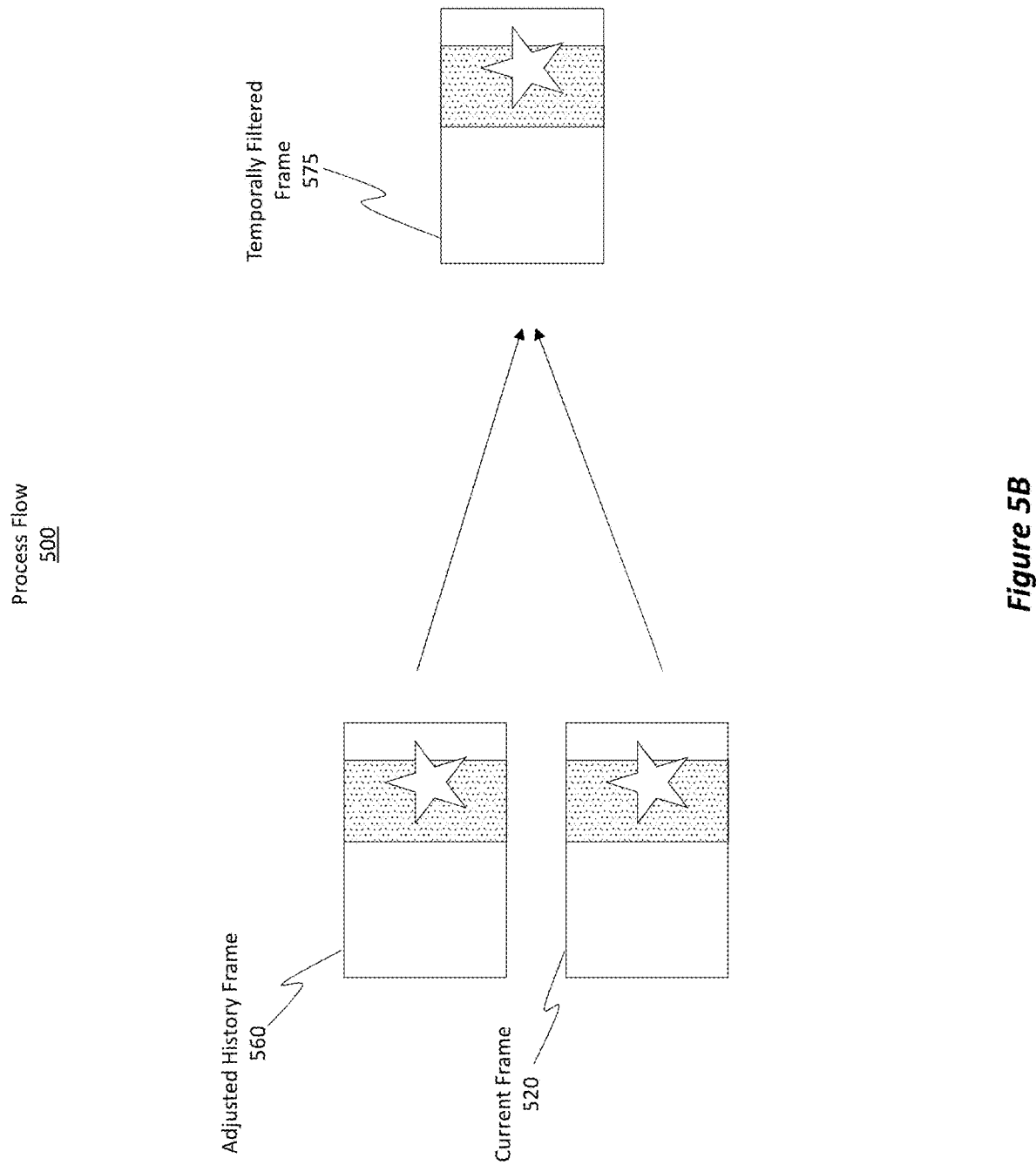

That is, as a result of performing this shift 480, FIG. 4E shows a resulting adjusted history frame 495, which reflects the new positions of the pixels and which is now substantially similar to the current frame 415. To clarify, the adjusted history frame 495 should now be within a threshold similarity 495A relative to the current frame 415. After global and local compensations are performed, the embodiments can then temporally filter the images (e.g., the adjusted history frame 495 and the current frame 415) to generate a combined image. FIGS. 5A and 5B provide another illustration of the example processes.

FIG. 5A shows a process flow 500 that generally outlines the processes that were performed in FIGS. 4A to 4E. Initially, a history frame 505 is acquired. This frame is taken from or which includes a particular pose 510 of the camera (or perhaps is an existing temporally filtered image) and includes an object 515, which is representative of the object 405 from FIG. 4A.

The embodiments obtain a current frame 520, which is taken from a particular pose 525 of the camera and which also includes an object 530. Using IMU data, which tracked the movement of the camera from the time when the history frame 505 was generated to the time when the current frame 520 was generated, the embodiments are able to perform a global MC 535 operation to transform or reproject the pose 510 to the pose 540, which matches or aligns with the pose 525.

Despite performing the global MC 535 operation, the object 545 (which corresponds to object 515) is not in the correct location. For instance, one can observe the positioning difference between the object 545 and the object 530.

In accordance with the disclosed principles, the embodiments perform an optical flow calculation 550 by segmenting pixels that are determined to correspond to moving objects, such as by taking the absolute difference between the current frame 520 and the history frame 505 after performing the global MC 535 operation. Computing the optical flow vectors is performed in the manner described previously.

The embodiments then apply the optical flow vectors to specific pixels (e.g., the star pixels, or rather the pixels corresponding to moving objects) in the history frame 505 (after the global MC 535 operation was performed), as shown by the local MC 555 operation. As a result of applying the optical flow vectors, an adjusted history frame 560 is generated. This adjusted history frame 560 is a modified version of the history frame 505, where the modifications include changes to account for global movements of the camera and local movements of the object 515.

When performing the optical flow calculation 550, some embodiments are configured to down-sample 565 one or both of the history frame 505 (after being subjected to the global MC 535 operation) and the current frame 520. Typically, it is the current frame 520 that is down-sampled. By down-sampling one or both of these frames, the resulting frames have a lower image resolution. When significant amounts of noise are present in an image, down-sampling to a lower resolution can actually result in an improved image analysis, such as when attempting to identify corresponding pixels between multiple images.

While the images are in the down-sampled state, the embodiments can identify corresponding pixels between the two images. With these pixels identified, the embodiments can then compute the optical flow vector for that pixel as well as for any other segmented pixels representing a moving object.

After the optical flow vectors are computed for the various pixels, the embodiments can then up-sample 570 the images. Different up-sampling techniques can be used. As examples only, the embodiments can perform a bilateral upscaling/up-sampling operation. In some cases, the embodiments can perform bilinear upscaling.

As another example, one pixel might be up-sampled such that it is split into perhaps four pixels (this is an example number only, other values can be used). The optical flow vector that was originally assigned to the single pixel can now also be assigned to the four newly generated pixels. Those optical flow vectors can then be applied to the four corresponding pixels in the history frame 505 (after the global MC 535 operation was performed) in order to generate the adjusted history frame 560.

The process flow 500 continues in FIG. 5B. With the pose and content of the adjusted history frame 560 now corresponding to the pose and content of the current frame 520, the embodiments can temporally filter these two images together. As a result of performing the temporal filtering process on the adjusted history frame 560 and on the current frame 520, a temporally filtered frame 575 is generated. This temporally filtered frame 575 can then be displayed to a user or, alternatively, it can operate as a history frame for a new iteration of the process flow 500.

The process of temporally filtering the current frame 520 with the adjusted history frame 560 (e.g., the history frame that has been subjected to global and local MC operations) to generate the temporally filtered image can include an averaging process or rather, a weighted averaging process. That is, the embodiments can average pixels (that might be weighted) in the history frame, or rather the adjusted history frame 560, with pixels (that might be weighted) in the current frame 520. In this sense, the process of generating the temporally filtered image can be performed by using weighted averages of the current frame and the history or adjusted frame.

As a result of shifting some pixels, it may be the case that content that was previously occluded by those pixels is now no longer occluded. It may be the case, however, that the history frame does not include adequate data to fully represent this now-revealed content. To account for such scenarios, the embodiments can extract the no-longer-occluded content from the current frame during the temporal filtering process in order to fill in those areas. That is, the embodiments can modify or adjust a weighting technique (e.g., the weighted averages) used during the temporal filtering process to ensure that the content for those specific regions is weighted more heavily in favor of the current frame 520. As a result of this increased weighting in which the current frame is biased (for those specific regions), the embodiments will pull more data from the current frame 520 than from the adjusted history frame 560. The data from the current frame 520 can then be used to fill in the now-revealed areas.

In some cases, the embodiments can also down-sample the current frame 520, extract data for those specific regions mentioned above, and then up-sample the data again, similar to the processes mentioned earlier. Again, any type of bilateral or bilinear upscaling can be performed.

Accordingly, in some scenarios, for content that was previously occluded in the history frame by the set of pixels but that is now not occluded by the set of pixels, the embodiments can obtain image data for that content from the current frame. That content can then be included in the temporally filtered frame/image. Optionally, prior to obtaining the content from the current frame, the embodiments can down-sample the current frame to a lower resolution and then later up-sample the extracted content.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
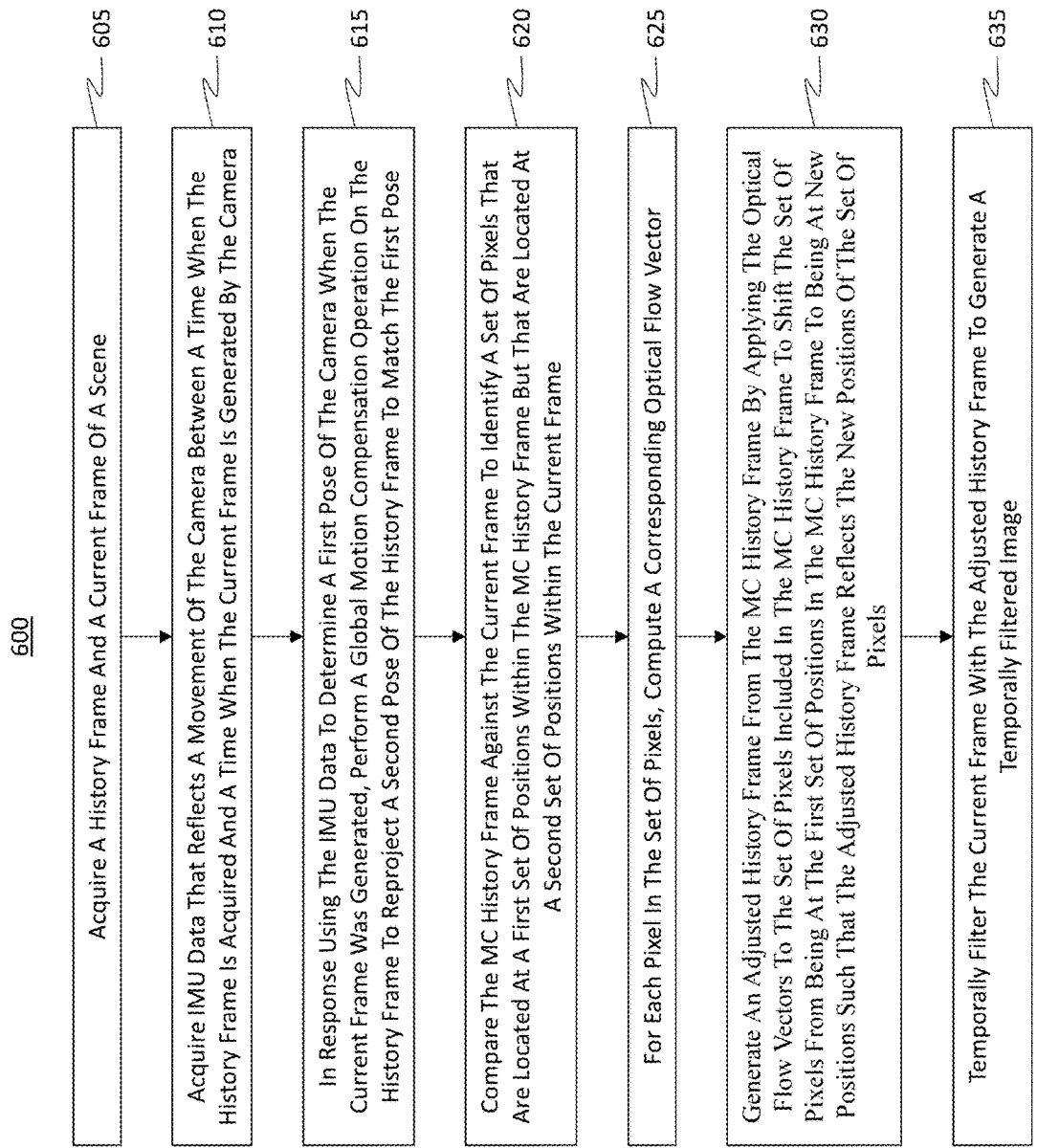
FIG. 6 illustrates a flowchart of an example method for generating a temporally filtered image designed to compensate for global motions of a camera and to compensate for local motions of one or more objects that are locally moving within a scene.

Attention will now be directed to FIG. 6, which illustrates a flowchart of an example method 600 for generating a temporally filtered image that is designed to compensate for global motions of a camera and to compensate for local motions of one or more objects that are locally moving within a scene. In some cases, the method 600 can be performed by the HMD 100 of FIG. 1. In some cases, the method 600 can be performed by a server operating in a cloud environment.

Initially, method 600 includes an act (act 605) of acquiring a history frame (e.g., history frame 400 from FIG. 4A)

and a current frame (e.g., current frame 415) of a scene (e.g., scene 400A). Notably, the current frame is generated by a camera. In some cases, the history frame can be generated by the same camera while in other cases the history frame can be a temporally filtered image that has been generated by compiling information from multiple, previously generated images. That is, in some cases, the history frame is a previously generated temporally filtered image.

Act 610 includes acquiring inertial measurement unit (IMU) data that reflects a movement of the camera between a time when the history frame is acquired and a time when the current frame is generated by the camera. Optionally, feature correspondences can also be used in order to determine poses of the different frames.

In response to determining a first pose (e.g., pose 425) of the camera when the current frame was generated, or rather, in response to using the IMU data (or optionally the feature correspondences) to determine the first pose of the camera, act 615 includes performing a global motion compensation operation on the history frame to reproject (e.g., reproject 440) a second pose (e.g., pose 410) of the history frame to match the first pose (e.g., pose 425). That is, the IMU data can be used to perform the global motion compensation operation.

After performing the global motion compensation operation, act 620 includes comparing the motion compensated history frame against the current frame to identify a set of pixels (representing specific content) that are located at a first set of positions within the history frame but that are located at a second set of positions within the current frame (in other words, the content has moved). The set of pixels corresponds to one or more objects that moved locally within the scene. Further, the second set of positions are different than the first set of positions. For instance, FIG. 4C showed how pixels that represent the same content (e.g., the woman performing the pullup) are located at different positions in the two images. The embodiments are able to compare the current frame 415 in FIG. 4C against the motion compensated frame 435 to identify the pixels that correspond to moving objects (e.g., the woman).

In some implementations, the process of comparing the motion compensated history frame against the current frame to identify the set of pixels is performed after one or perhaps after both of the current frame and the motion compensated history frame are down-sampled to a reduced resolution. If only a single image is down-sampled, then the embodiments select the current frame as the frame that will be down-sampled because the motion compensated history frame is a temporally filtered frame and likely has a much higher quality than the current frame.

In some implementations, the process of comparing the motion compensated history frame against the current frame to identify the set of pixels can include computing an absolute difference. This absolute difference is computed between the motion compensated history frame and the current frame.

For each pixel in the set of pixels, act 625 includes computing a corresponding optical flow vector. As a result, a plurality of optical flow vectors are computed. These optical flow vectors map movement of the one or more objects, where the movement is represented by the set of pixels being at the first set of positions in the motion compensated history frame and being at the second set of positions in the current frame.

Act 630 includes generating an adjusted history frame from the motion compensated history frame by applying the plurality of optical flow vectors to the set of pixels included in the motion compensated history frame to shift the set of pixels from being at the first set of positions in the motion compensated history frame to being at new positions such that the adjusted history frame reflects the new positions of the set of pixels. These new positions in the adjusted frame correspond to the second set of positions that were identified in the current frame for the set of pixels.

The process of shifting the set of pixels from being at the first set of positions in the history frame to being at the new positions in the adjusted frame is performed in two-dimensional (2D) space. As a consequence, the shifting process is a 2D transformation on a per pixel basis; it is not a 3D reprojection process.

After shifting the set of pixels to the new positions in the adjusted frame, act 635 includes temporally filtering the current frame with the adjusted frame to generate a temporally filtered image. The temporally filtered frame 575 is representative. In some cases, the temporally filtered image operates as a new history frame for a subsequent iteration of method 600.

Accordingly, the disclosed embodiments are beneficially able to compensate for both global movements and local movements. In doing so, the embodiments are able to significantly improve image quality.

Example Computer/Computer Systems

Figure 7:
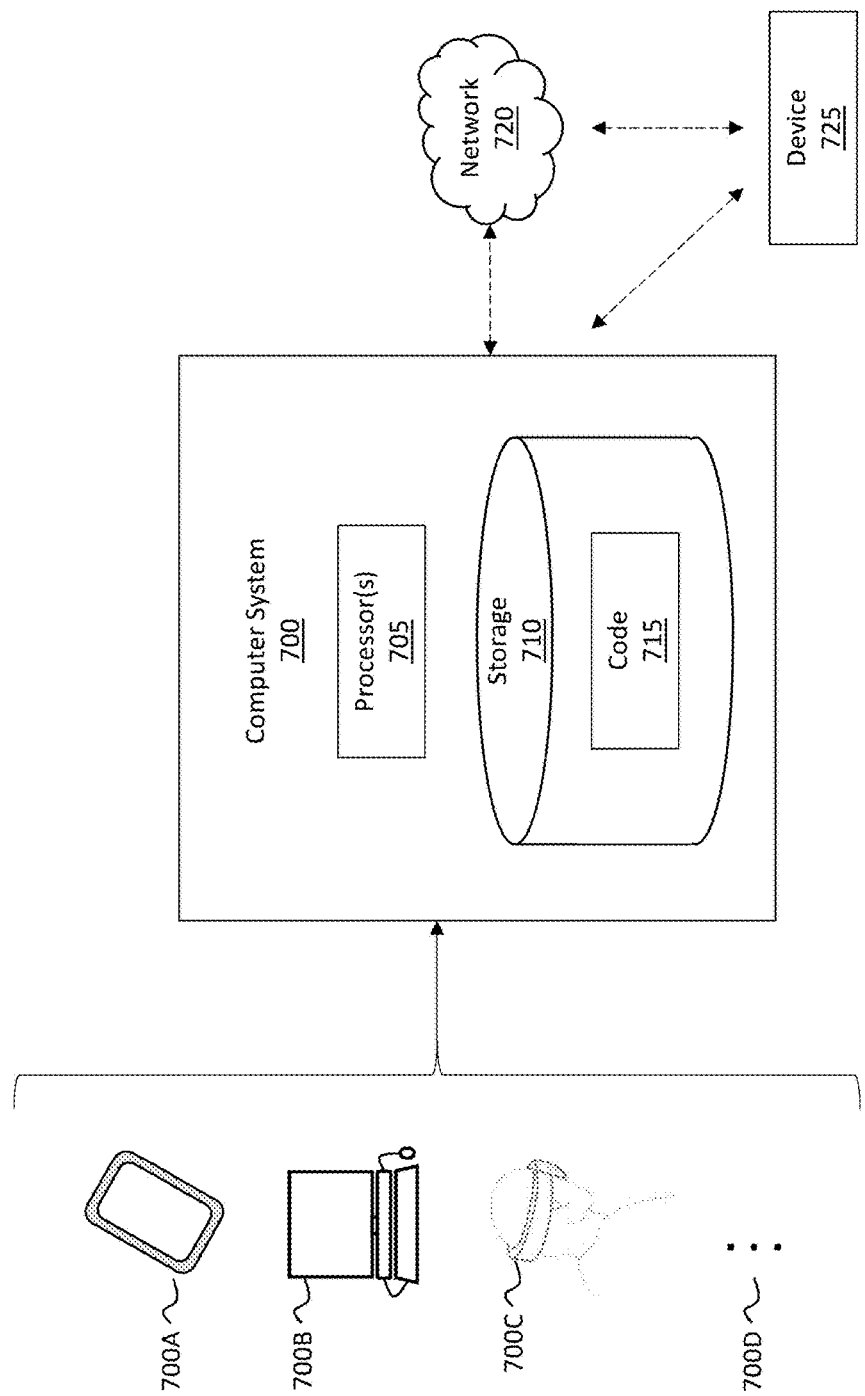
FIG. 7 illustrates an example computer system that may be configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet 700A, a desktop or a laptop 700B, a wearable device 700C, a mobile device, or any other standalone device, as represented by the ellipsis 700D. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "model," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions (i.e. code 715). The executable instructions represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices (e.g., device 725) or cloud services to obtain or process data. In some cases, network 720 may itself be a cloud network. Furthermore, computer system 700 may also be connected through one or more wired or wireless networks 720 to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to generate a temporally filtered image that is designed to compensate for global motions of a camera and to compensate for local motions of one or more objects that are locally moving within a scene, said computer system comprising:

one or more processors; and
one or more computer-readable hardware storage devices that store instructions that are executable by the one or more processors to cause the computer system to:
acquire a history frame and a current frame of a scene, wherein the current frame is generated by a camera;
in response to determining a first pose of the camera when the current frame was generated, perform a global motion compensation operation on the history frame to reproject a second pose of the history frame to match the first pose;

after performing the global motion compensation operation, compare the motion compensated history frame against the current frame to identify a set of pixels that are located at a first set of positions within the motion compensated history frame but that are located at a second set of positions within the current frame, the set of pixels corresponding to one or more objects that moved locally within the scene, the second set of positions being different than the first set of positions;

for each pixel in the set of pixels, compute a corresponding optical flow vector such that a plurality of optical flow vectors is computed, wherein the plurality of optical flow vectors map movement of the one or more objects, where the movement is represented by the set of pixels being at the first set of positions in the motion compensated history frame and being at the second set of positions in the current frame;

generate an adjusted history frame from the motion compensated history frame by applying the plurality of optical flow vectors to the set of pixels included in the motion compensated history frame to shift the set of pixels from being at the first set of positions in the motion compensated history frame to being at new positions such that the adjusted history frame reflects the new positions of the set of pixels, said new positions in the adjusted history frame corresponding to the second set of positions that were identified in the current frame for the set of pixels; and after shifting the set of pixels to the new positions in the adjusted history frame, temporally filter the current frame with the adjusted history frame to generate a temporally filtered image, wherein temporally filtering the current frame with the adjusted history frame includes:

identify first content in the current frame, wherein the first content is not represented in the adjusted history frame;

determining that the first content was previously occluded in the motion compensated history frame by at least some pixels in the set of pixels;

as a result of said at least some pixels in the set of pixels being shifted, determining that the first content should not be occluded in the adjusted history frame;

determining that the motion compensated history frame does not include adequate data to fully represent the first content in the adjusted history frame; and during the temporal filtering, selectively biasing the current frame over the adjusted history frame by extracting the first content from the current frame but not from the adjusted history frame.

2. The computer system of claim 1, wherein wherein, prior to obtaining said first content from the current frame, the current frame is down-sampled to a lower resolution.

3. The computer system of claim 1, wherein generating the temporally filtered image is performed by using weighted averages of the current frame and the adjusted history frame.

4. The computer system of claim 1, wherein each optical flow vector in the plurality of optical flow vectors is a two-dimensional (2D) vector.

5. The computer system of claim 1, wherein a first optical flow vector included in the plurality of optical flow vectors is different than a second optical flow vector included in the plurality of optical flow vectors.

6. The computer system of claim 1, wherein shifting the set of pixels from being at the first set of positions in the motion compensated history frame to being at the new positions in the adjusted history frame is performed in two-dimensional (2D) space such that said shifting is a 2D transformation on a per pixel basis.

7. The computer system of claim 1, wherein generating the current frame is performed at a rate of about 90 frames per second.

8. The computer system of claim 1, wherein comparing the motion compensated history frame against the current frame to identify the set of pixels is performed using a block-matching algorithm.

* * * * *